(12) United States Patent
Williamson

(10) Patent No.: US 7,437,791 B2
(45) Date of Patent: Oct. 21, 2008

(54) APPARATUS FOR REMOVING INSECTS FROM PRODUCE

(76) Inventor: Robert L. Williamson, 67602 - 62nd St., Hartford, MI (US) 49057

(*) Notice: Subject to any disclaimer, the term of this patent is extended or adjusted under 35 U.S.C. 154(b) by 760 days.

(21) Appl. No.: 10/978,022

(22) Filed: Oct. 29, 2004

(65) Prior Publication Data
US 2006/0090273 A1    May 4, 2006

(51) Int. Cl.
 *A23N 15/06*    (2006.01)
 *A23N 12/00*    (2006.01)
(52) U.S. Cl. .................................. 15/3.16; 15/3.21
(58) Field of Classification Search ............... 15/3.16, 15/3.1, 3.21
See application file for complete search history.

(56) References Cited
U.S. PATENT DOCUMENTS
755,937 A * 3/1904 Richardson et al. .......... 15/3.11
* cited by examiner

*Primary Examiner*—David B Thomas
(74) *Attorney, Agent, or Firm*—R. Tracy Crump

(57) ABSTRACT

An apparatus for removing Japanese beetles and other insects from blueberries and other small produce without damaging or discarding any produce. The apparatus includes a produce conveyer formed by a plurality of elastic bands trained around four traverse rollers. A plurality of brushes are suspended above the top conveyer run and a plurality of rakes are supported between the top conveyer run. The brushes have soft, flexible bristles, which extend downward to contact the blueberries as it moves past the brushes carried atop the conveyer. The rakes have a plurality of spaced fingers that extend upward at an angle between adjacent conveyer bands. As the blueberries pass under the brushes, the bristles lightly contact the berries to gently turn the berries so that the beetles hang from the underside of the berries where they are knocked off the berries by the rake fingers.

6 Claims, 4 Drawing Sheets

APPARATUS FOR REMOVING INSECTS FROM PRODUCE

BACKGROUND OF THE INVENTION

The Japanese beetle (*Popillia japonica*) presents a serious problem for various small produce, and particularly, the blueberry industry. The Japanese beetle is a scarab beetle that feeds on blueberries clinging to individual berries with their powerful clawed legs. For the process blueberry market, a zero threshold for rejection (zero insects in any of the packages of blueberries) is often required of blueberry packagers. Conventional pesticides are only designed to chemically control the population and concentration of beetles in the fields. Pesticides cannot prevent the beetles from clinging to the individual berries and therefore cannot ensure the zero threshold through the harvest and packaging process. Beetles must still be physically removed from the harvested berries before packaging. Heretofore, packagers have relied on manual labor and/or sophisticated automated berry sorting equipment to remove beetles from the harvested berries. Automated berry sorting equipment uses photo-optics and spectrum analysis to remove off-colored and/or undersized blueberries, but can be setup to detect and remove beetles. Automated berry sorting equipment is expensive and generally unreliable as a tool for removing beetles from blueberries. Consequently, a simple and cost effective apparatus for removing beetles from harvested blueberries is needed.

SUMMARY OF THE INVENTION

The de-bugging apparatus embodying the present invention includes a produce conveyer formed by a plurality of elastic bands trained around four traverse rollers. A plurality of brushes are suspended above the top conveyer run and a plurality of rakes are supported between the top conveyer run. The brushes have soft, flexible bristles, which extends downward to contact the blueberries as they move past the brushes carried atop the conveyer. The rakes have a plurality of spaced fingers that extend upward at an angle between adjacent conveyer bands. As the blueberries pass under the brushes, the bristles lightly contact the berries to gently turn the berries so that the beetles hang from the underside of the berries where they are knocked off the berries by the rake fingers. As the beetles are knocked off the berries, they fall onto an inclined shoot and into a collection bin. The blueberries reach the end of the top conveyer run beetle-free and ready for packaging.

Accordingly, the present invention safely removes Japanese beetles from blueberries without damaging or discarding any berries. It can remove insects quickly from large volumes of produce in a conveyer based system and eliminates the need for sophisticated sorting machines and manual labor in the beetle removal process. The simple design and operation of the debugger makes it cost effective for both small and large blueberry producers and packagers. The teaching of the present invention can be applied for use in removing other insects from other types of small produce. These and other advantages of the present invention will become apparent from the following description of an embodiment of the invention with reference to the accompanying drawings.

BRIEF DESCRIPTION OF THE DRAWINGS

An embodiment of the present invention is illustrated in the drawings, in which.

DESCRIPTION OF THE PREFERRED EMBODIMENTS

Figure 1:
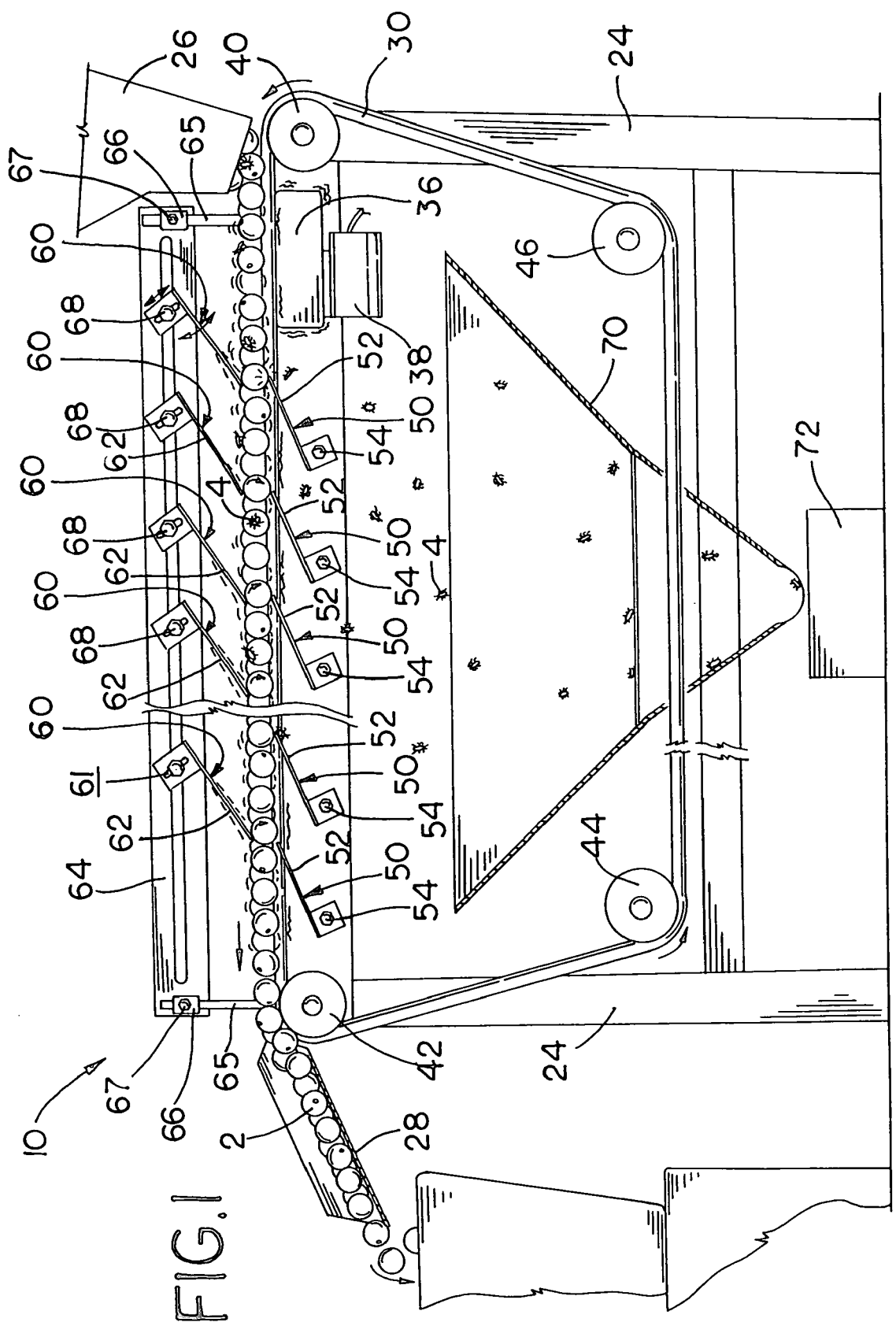
FIG. 1 is side plan view of an embodiment of the present invention showing beetles being removed from blueberries.

Referring now to the drawings, a debugging apparatus, or simply "debugger" is generally designated as reference numeral 10. Debugger 10 is designed to be used as a stand alone size sorting unit or as a component unit in an automated conveyer driven packaging system for removing clinging insects, such as Japanese beetles, from bulk quantities of small produce, such as blueberries, grapes, cherries, cherry tomatoes, and similar small produce. While debugger 10 is particularly well suited for removing Japanese beetles from blueberries and the teaching of this invention are conveniently illustrated and described relating to the removal of Japanese beetles from blueberries, it should be understood that the teaching of this invention may be applied to the removal of various other insects from other types of small produce.

Debugger 10 is built upon a fixed table-like frame 20 and includes two elevated parallel side members 22 supported by four upright legs 24. Frame 20 also includes various cross braces, which support and connect side members 22 and legs 24. Frame 20 supports a produce conveyer formed by a plurality of continuous elastic conveyer bands 30 trained about four transverse rollers 40, 42, 44 and 46 (see FIGS. 1-4). Conveyer bands 30 are constructed of a length of a suitable elastic material, such as a synthetic rubber, whose ends are joined to form a continuous band. Drive roller 40 and end roller 42 are rotatably mounted between side members 22 at the front and rear ends of frame 20, respectively, such that the top conveyer run (designated generally as reference numeral 32) extends the entire length and transverses substantially the entire width of debugger 10. Drive roller 40 and end roller 42 each have a plurality of parallel annular grooves 41 in which conveyer bands 30 are seated (FIG. 1). Grooves 41 are uniformly spaced at fixed distances along the length of rollers 40 and 42 and ensure that conveyer bands 30 remain trained about the rollers at a fixed horizontal spacing across the top conveyer run 32. The return run of the conveyer is formed by tension rollers 44 and 46, which are adjustably mounted to frame 20 by vertical adjusters 45. Vertical adjusters 45 allow tension rollers 44 and 46 to be raised and lowered to adjust the tension of conveyer bands 30.

Figure 2:
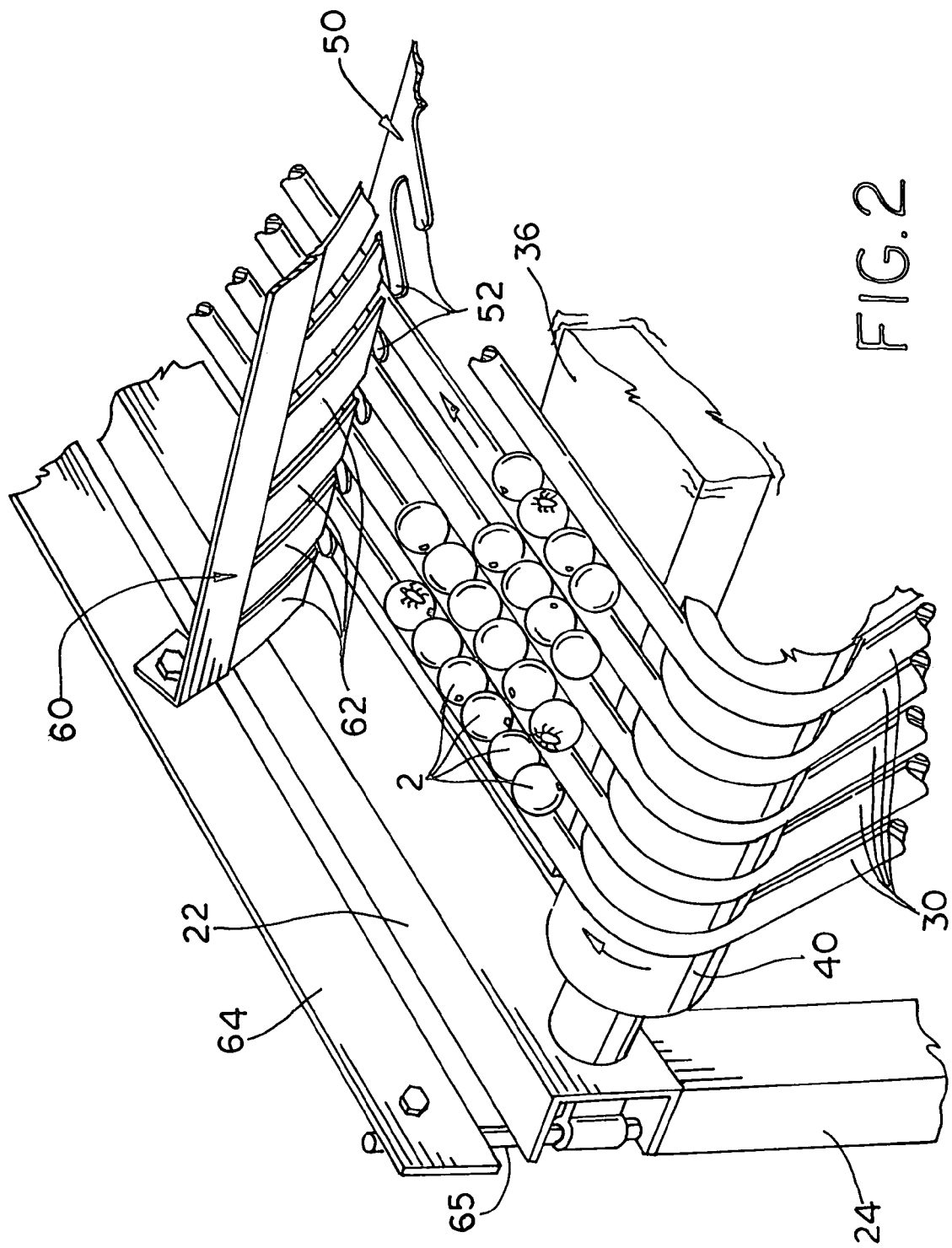
FIG. 2 is a partial perspective view of the embodiment of FIG. 1 showing the conveyer bands transporting the blueberries between a brush and rake.
Figure 3:
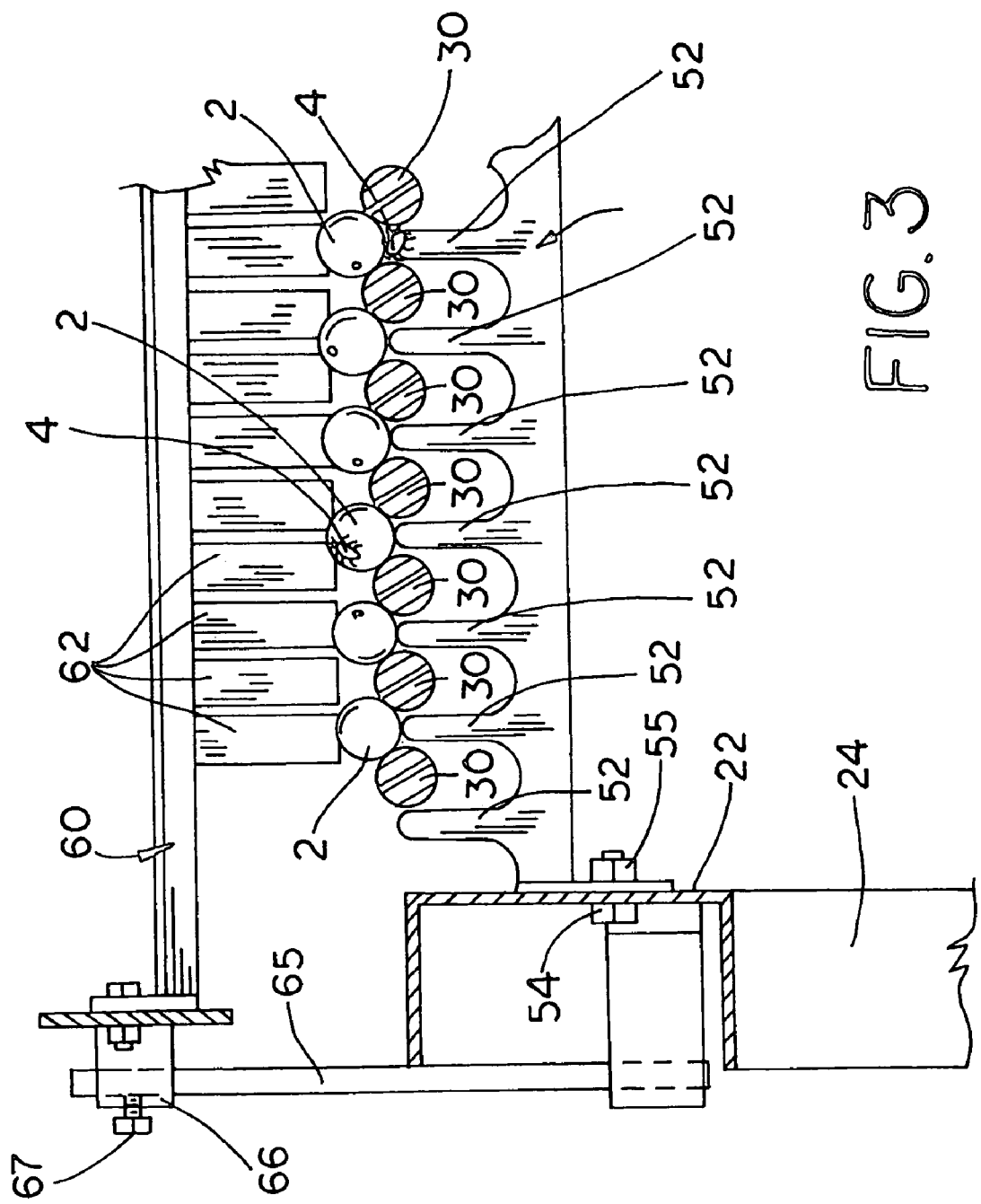
FIG. 3 is a partial end sectional view of the embodiment of FIG. 1 showing the conveyer bands transporting the blueberries between a brush and rake.

A drive motor (not shown) is mounted near the rear end of side members 24 and is operatively connected to drive roller 40 to transfer movement to the conveyer. Preferably, the drive motor is a variable speed electric motor of the type commonly used in such applications and well known in the art. As best shown in FIG. 2, conveyer bands 30 pass over a vibrator plate 36, which is mounted transversely between side members 22 adjacent drive roller 40. An electric motor (not shown) is mounted beneath vibrator plate 36 and rotates an eccentric weight (also not shown) to impart a slight vibration to the plate and thereby to conveyer bands 30. The vibration of the conveyer bands 30 helps rotate individual berries as they move along top conveyer run 32. Typically, both the conveyer drive motor and the vibrator motor are wired to a conventional electronic controller. Such controllers are used to control the operation of each motor and are well known in the industry.

A plurality (four) of angled rakes 50 are transversely mounted to frame 20 below top conveyer run 32. Each rake 50 is configured to have a plurality of spaced fingers 52. Rakes 50 are constructed from a flat band of rigid metal, such as stainless steel or some other suitable material, which is cut or stamped to form fingers 52. Alternatively, rakes may be formed by metal castings or molded from various plastics in the desired rake configuration. As shown in the figures, rake fingers 52 are spaced so that a finger extends upward at an angle between adjacent conveyer bands 30. Rake fingers 52 are angled so that the top of each finger extends just below the centers of conveyer bands 30. Rakes 50 are mounted to frame by bolts 54 and nuts 55, which allow the angle of the rake to be adjusted thereby positioning the top of fingers 52 at various heights with respect to conveyer bands 30.

A plurality (four) of angled brushes 60 are suspended transversely above top conveyer run 32. Each brush 60 includes a plurality of soft, flexible bristles 62, which extend downward to contact the berries as they move past the brushes atop the conveyer. Bristles 62 may be constructed from a variety of materials suitable for contacting, but not damaging the berries. Typically, a sheet of flexible material, such as a thin plastic film, with a plurality of vertical slits forms bristles. It should be noted that the bristle material must be sanitary and cleanable as well as soft and pliable. Brushes 60 are mounted between two brush supports 64 that are elevated above conveyer run 32 by four uprights 65. A collar 66 and bolt 67 secure brush supports 64 to uprights 65 so that brushes 60 can be raised and lowered with respect to top conveyer run 32. Brushes 60 are mounted to supports 64 by bolts 68 and nuts 69, which allow the angle of bristles 62 to be adjusted.

As shown in FIG. 1, a dispensing hopper 26 deposits the bulk quantities of blueberries onto top conveyer run 32 at the front of debugger 10. A produce shoot 28 is mounted to frame 20 at the end of top conveyer run 32, which deposits beetle-free produce into a storage container (not shown) or onto the conveyers of other processing and packaging equipment (not shown). An angled insect tray 70 is mounted to frame 20 below rakes 50. Insect tray 70 is constructed of a smooth flat sheet metal and is positioned and angled so that the beetles falling from the produce slide down the tray into a collection bin 72.

In operation, berries 2 are metered from hopper 26 or other transport conveyer (not shown) onto top conveyer run 32 over vibrator plate 36. Vibrations from vibrator plate 36 help spread the berries across the width of top conveyer run 32. Berries 2 travel from one end of debugger 10 to the other while beetles 4 are physically knocked from the individual berries and collected in bin 72. Berries 2 are propelled along top conveyer run 32 with individual berries settling between adjacent conveyer bands 30. Bristles 62 lightly contact berries 2 as they pass under brushes 60. Some beetles 4 are knocked off of berries 2 by the contact with brush bristles 62, but most will continue to cling to the berries and will be knocked off by rakes 50. The light contact of brush bristles 62 along with the vibrations from vibrator plate 36, turn and rotate the individual berries 2 so that any beetles 4 cling and hang from the underside of the berries. As berries 2 passes over rake 50, any beetles 4 clinging to the bottom of the berries are knocked off by rake fingers 52. As beetles 4 are knocked off the berries, they fall onto tray 70 and into collection bin 72. Berries 4 reach the end of top conveyer run 32 beetle-free and ready for packaging.

Figure 4:
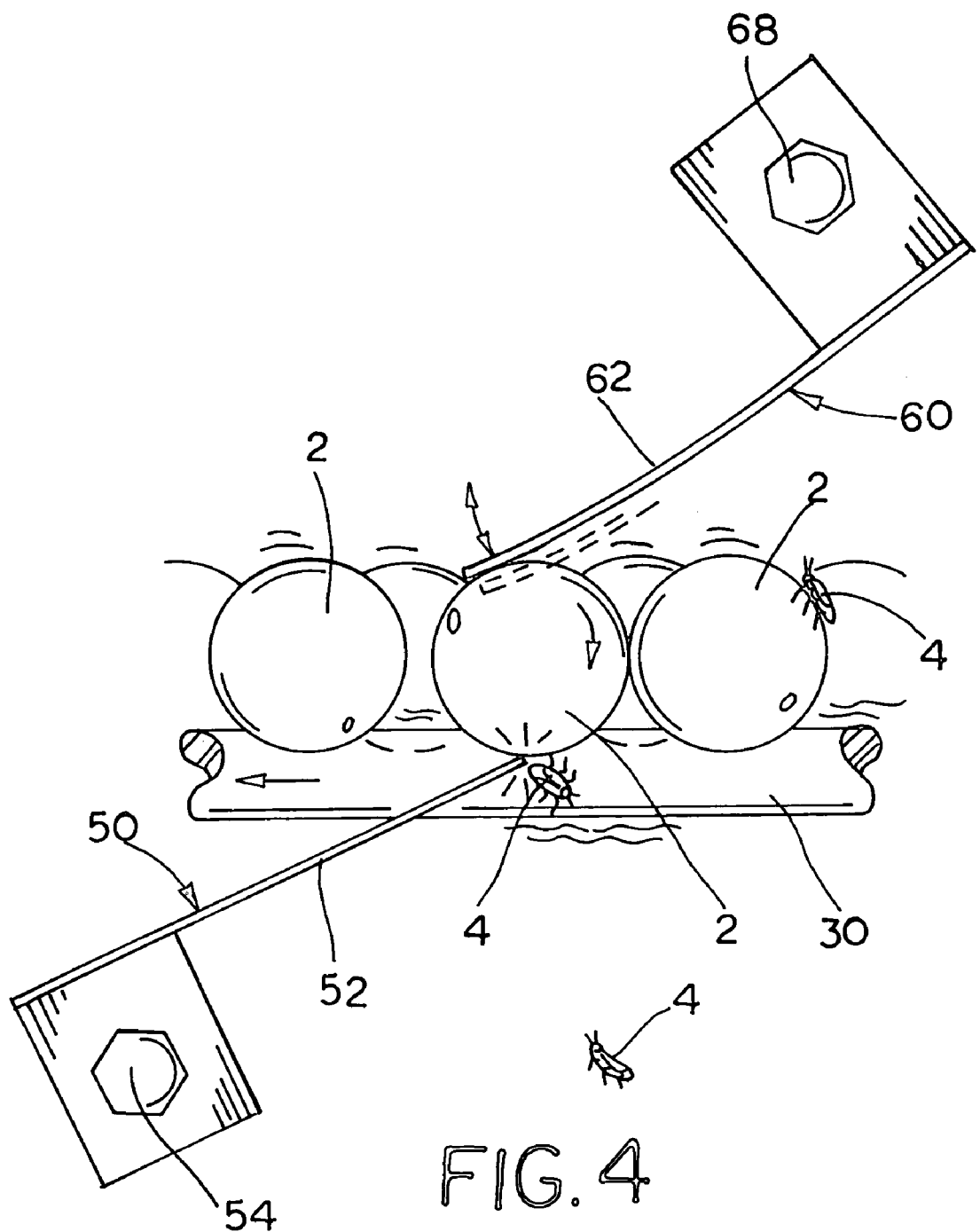
FIG. 4 is simplified side plan view of a rake and brush operating on the berries carried atop of the conveyer bands of the embodiment of FIG. 1.

It should be noted that the attitude and position of brushes 60 in relation to conveyer bands 30 is adjustable so that sufficient contact is made with the berries to turn, but not damage the them. Likewise, the attitude (angle) and position of rakes 50 in relation to conveyer bands 30 is adjustable to ensure that range fingers 52 will knock off any beetles clinging to the bottoms of the berries. As best shown in FIG. 4, a brush 60 and a rake 50 are positioned and oriented with respect to one another so that brush bristles 62 contact a berry 2 just as the berry passes the end of rake finger 52. This configuration helps to brace and stabilize the berry as the beetle is knocked off by the rake finger.

ADVANTAGES

One skilled in the art will note the present invention physically removes beetles and other insects from blueberries without discarding or damaging the berries. The present invention can quickly remove beetles from large quantities of berries and eliminates the use of sophisticated sorting machines and manual labor for beetle removal. It can be used with other packaging equipment and be easily incorporated into existing process packaging systems. The simple design and operation of the debugger makes it cost effective for both small and large blueberry producers and packagers. The present invention can also be adapted for use in removing other types of insects from a variety of other small produce as well as blueberries.

The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. An apparatus for removing insects from small produce where the insects physically cling to the produce, the apparatus comprising:

a frame having a first end and a second end;

a longitudinally extending conveyer supported by the frame for carrying the produce deposited thereupon from the first frame end to the second frame end, the conveyer includes a first roller, a second roller, a plurality of conveyer bands trained about the first and second rollers and spaced transversely across the width of the first and second rollers so as to form a horizontal top conveyer run between the first and second rollers, and drive means for propelling the conveyer bands about the first and second rollers;

means mounted to the frame between the first and second rollers for rotating the produce atop the conveyer so that the insects clinging to the produce will be positioned to cling from the underside of the produce between adjacent conveyer bonds; and a plurality of fingers mounted to the frame beneath the conveyer between the first and second rollers, each of the plurality of fingers extending upward between adjacent conveyer bands for knocking insects from the produce as the produce are transported on the conveyer over the plurality of fingers when the insect is clinging to the underside of the produce.

2. The de-bugging apparatus of claim 1 wherein the rotation means includes an elongated brush suspended transversely above the top conveyer run for contacting the produce as the produce is carried atop the top conveyer run.

3. The apparatus of claim 2 wherein the brush and the plurality of fingers are position with respect to each other so that the brush contacts the produce as the produce is carried past the plurality of fingers atop the conveyer.

4. The apparatus of claim 2 wherein the brush is adjustably mounted to the frame to adjust the position and attitude of the brush with respect to the conveyer.

5. The apparatus of claim 1 wherein the rotating means also includes a vibrator plate mounted to the frame transversely beneath the conveyer for imparting vibrations to the conveyer bands.

6. The apparatus of claim 1 wherein the plurality of fingers are mounted to a rake part, the rake part adjustably connected to the frame transversely beneath the top conveyer run to adjust the position and attitude of the plurality of fingers with respect to the conveyer.

* * * * *